Oct. 27, 1936.  R. G. STALLARD  2,058,735
WATER METER COUPLING
Filed June 20, 1935

Inventor
R. G. Stallard.
By Lacey & Lacey, Attorneys

Patented Oct. 27, 1936

2,058,735

UNITED STATES PATENT OFFICE 2,058,735

WATER METER COUPLING

Roswell G. Stallard, Longview, Wash.

Application June 20, 1935, Serial No. 27,601

1 Claim. (Cl. 285—13)

This invention relates to pipe couplings and more particularly to a coupling especially designed for use on water meters.

The object of the invention is to provide a comparatively simple and inexpensive coupling embodying in its structure relatively few parts and by means of which the water intake and discharge pipes of a standard water meter may be securely and expeditiously coupled to the attaching nipples thereof.

A further object of the invention is to provide a coupling including a coupling sleeve having a compression member slidably mounted therein and provided at one end thereof with an inwardly extending flange which coacts with a gasket at the end of the threaded meter nipple and also with a packing carried by the coupling sleeve, whereby when said sleeve is screwed home, the packing will be compressed against the water pipe and the gasket against the end of the nipple so as to hold the parts securely in assembled position and effectually prevent leakage.

A still further object of the invention is generally to improve this class of devices so as to increase their utility, durability and efficiency.

Figure 1:
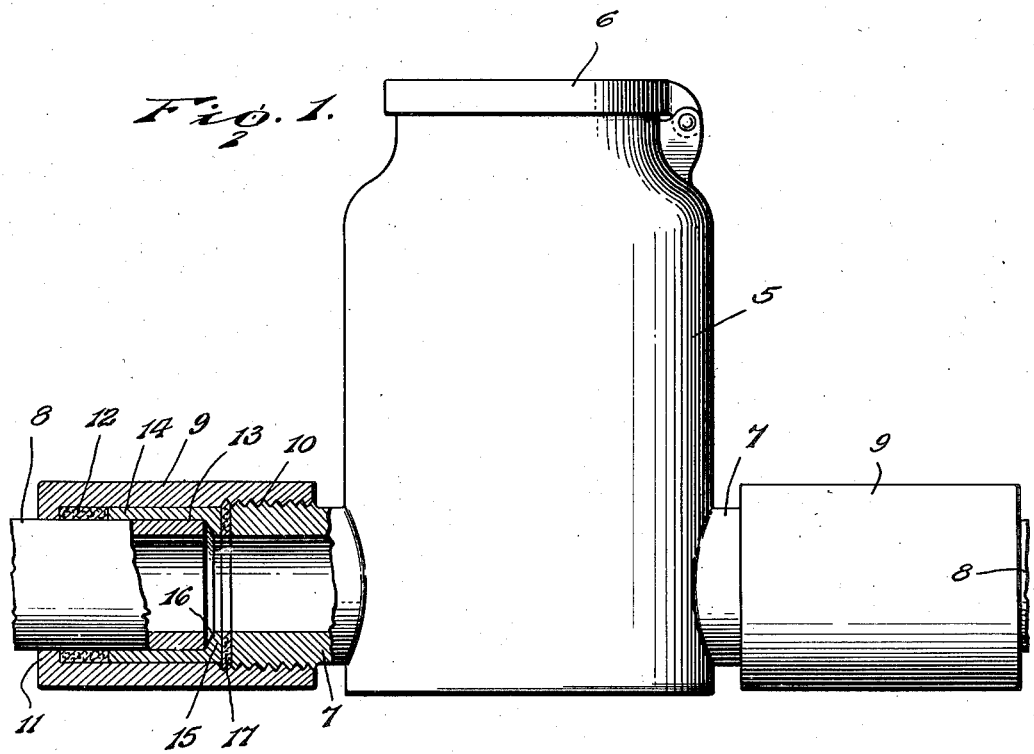

In the accompanying drawing forming a part of this specification and in which similar numerals of reference indicate corresponding parts in all the figures of the drawing, Figure 1 is a side elevation, partly in section, of a water meter coupling embodying the present invention.

Figure 2:
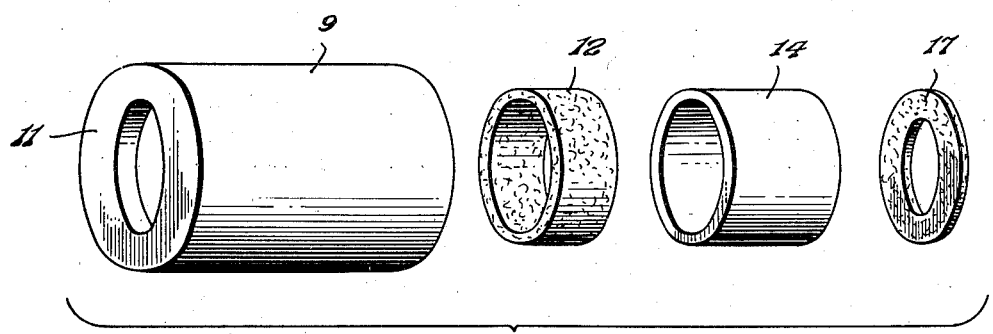

Figure 2 is a perspective view showing the different parts comprising the coupling detached and in position to be assembled.

The improved coupling forming the subject-matter of the present invention while capable of general application is principally designed for attachment to a water meter and by way of illustration is shown in connection with a standard meter 5 having a pivoted lid or closure 6 at the upper end thereof and provided at its lower end with oppositely disposed threaded nipples or spuds 7, as shown. The water meter is provided with the usual intake and discharge pipes, one of which is shown at 8 and the improved coupling is especially designed to detachably connect said pipes with the meter. Inasmuch as the couplings are identical in construction, a detail description of one will suffice. The coupling consists of a cylindrical sleeve 9 having its inner end threaded, at 10, for detachable engagement with the threads on the adjacent nipple 7 and its outer end provided with an inwardly extending circumferential flange 11, the inner end of which bears against and snugly receives the water pipe 8. Surrounding the pipe 8 and bearing against the flange 11 is a compressible packing 12 formed of rubber or other suitable material and the inner face of this packing 12 is normally in horizontal alinement with the inner face of the flange 11. That portion of the inner surface of the coupling sleeve 9 between the threads 10 and flange 11 is provided with a smooth unobstructed bearing surface 13 and slidably mounted within the sleeve and bearing against said smooth surface is a compression member 14 of a length slightly less than the length of said smooth bearing surface. The compression member 14 is preferably in the form of a cylindrical sleeve or thimble, the thickness of the walls of which is such that the inner surface of the nipple is flush with the inner edge of the flange 11 so that when the parts are assembled on the pipe 8, the inner edge of the flange 11 and the inner surface of the compression member will be in alinement and not offer any surface obstruction. The inner end of the compression member is provided with an inwardly extending flange 15 having its inner face flat and smooth and its outer face beveled at 16 to reinforce and strengthen the flange. Interposed between the inner smooth face of the flange 15 and the end of the adjacent threaded nipple 7 is a gasket 17, the purpose of which is to prevent leakage between the parts.

It will here be noted that when the coupling sleeve 9 is threaded on the adjacent nipple 7, the flange 15 will bear against the gasket 17, while the outer end of the member 14 will bear against the packing 12 so that when said sleeve is screwed home, the member 14 will serve the dual function of compressing the packing 12 against the pipe 8 and the gasket 17 against the end of the nipple so as to securely hold the parts together. It will furthermore be noted that the length of the compression member 14 is such as to permit slight longitudinal adjustment of the pipe 8 within the coupling and that the packing 12 will engage the pipe irrespective of its position of adjustment within the sleeve. Inasmuch as the inner face of the compression member and inner face of the flange 11 are in alinement, this longitudinal adjustment of the pipe 8 can be readily effected without disturbing either the packing or gasket.

In assembling the coupling, the packing 12 is positioned against the flange 11 of the sleeve 9 and the compression member 14 inserted within said sleeve and the latter fitted over the adjacent end of the pipe 8, after which the gasket is placed against the inner face of the flange 15 and said sleeve rotated on the threaded end of the nipple 7 either by hand or with a wrench or other suitable tool. As the coupling sleeve is screwed home, the compression member 14 will bear against the packing 12 and as said packing fits against the flange 11 it will be compressed against the pipe 8, while, at the same time, the gasket or washer 17 will be compressed between the outer face of the flange 15 and the adjacent end of the nipple 7 so as to effect a firm union between the water pipe and meter.

The device is simple in construction and effective in operation and may be operated by an unskilled person without the use of specially constructed tools. While the coupling is principally designed for application to water meters, it will, of course, be understood that said coupling may be used for effecting the union between any two sections of pipe. It will also be understood that the couplings may be made in different sizes and shapes and if desired the exterior of the coupling sleeve may be provided with a flattened face to facilitate gripping and rotating the same.

Having thus described the invention, what is claimed as new is:

A union for coupling a meter casing having externally threaded spuds between unthreaded ends of a pipe line, said union comprising a coupling sleeve internally threaded from one end for a portion of its length and unthreaded for the remainder of its length, the threaded end portion of said sleeve being adapted to be screwed upon the threaded spud and the unthreaded portion of the sleeve being adapted to be disposed about the unthreaded pipe and at the end of the sleeve being formed with an internal annular flange for fitting snugly about the unthreaded pipe, a compressor sleeve of less length than the unthreaded portion of the coupling sleeve received therein for fitting snugly about the unthreaded pipe with one end spaced from the flange of the coupling sleeve and its other end formed with an internal annular flange for extending between the pipe and the spud, a packing ring for fitting between the flanged end of the compressor sleeve and the end of the spud to form a tight joint, and packing for fitting about an unthreaded pipe between the flanged end of the coupling sleeve and the unflanged end of the compressor sleeve and adapted to be compressed about the unthreaded pipe to form a tight joint when the sleeve is tightened.

ROSWELL G. STALLARD.